US009833710B2

(12) United States Patent
Irwin, Jr.

(10) Patent No.: US 9,833,710 B2
(45) Date of Patent: Dec. 5, 2017

(54) METHOD AND SYSTEM FOR PROVIDING A SECURE SHUFFLE OF GAME OBJECTS ACROSS MULTIPLE ENTITIES

(71) Applicant: Scientific Games International, Inc., Newark, DE (US)

(72) Inventor: Kenneth Earl Irwin, Jr., Dawsonville, GA (US)

(73) Assignee: Scientific Games International, Inc., Newark, DE (US)

( * ) Notice: Subject to any disclaimer, the term of this patent is extended or adjusted under 35 U.S.C. 154(b) by 312 days.

(21) Appl. No.: 14/656,785

(22) Filed: Mar. 13, 2015

(65) Prior Publication Data

US 2015/0258450 A1    Sep. 17, 2015

Related U.S. Application Data

(60) Provisional application No. 61/952,303, filed on Mar. 13, 2014.

(51) Int. Cl.
| | |
|---|---|
| A63F 13/12 | (2006.01) |
| A63F 13/77 | (2014.01) |
| A63F 11/00 | (2006.01) |
| A63F 13/71 | (2014.01) |
| G07F 17/32 | (2006.01) |

(52) U.S. Cl.
CPC .......... *A63F 13/77* (2014.09); *A63F 11/0011* (2013.01); *A63F 13/71* (2014.09); *G07F 17/3225* (2013.01); *G07F 17/3272* (2013.01); *G07F 17/3283* (2013.01); *G07F 17/3293* (2013.01)

(58) Field of Classification Search
CPC ... G07F 17/32; G07F 17/3262; G07F 17/3293
See application file for complete search history.

(56) References Cited

U.S. PATENT DOCUMENTS

| | | | | |
|---|---|---|---|---|
| 6,030,288 A | * | 2/2000 | Davis | G06Q 40/025 463/29 |
| 7,350,069 B2 | * | 3/2008 | Herz | G06T 1/005 380/273 |
| 8,469,786 B2 | | 6/2013 | Suttle | |
| 8,641,522 B2 | | 2/2014 | Tarantino | |
| 2002/0052229 A1 | * | 5/2002 | Halliburton | A63F 1/00 463/9 |
| 2005/0221889 A1 | * | 10/2005 | Dupray | H04L 63/0428 463/29 |

(Continued)

FOREIGN PATENT DOCUMENTS

| | | |
|---|---|---|
| WO | WO 2006/036100 A1 | 4/2006 |
| WO | WO 2011/019949 A1 | 2/2011 |

OTHER PUBLICATIONS

PCT Search Report, dated Jun. 15, 2015.

*Primary Examiner* — James S McClellan
*Assistant Examiner* — Kevin Carter
(74) *Attorney, Agent, or Firm* — Dority & Manning, P.A.

(57) ABSTRACT

A computer-implemented method and system are provided for ensuring the integrity and security of digital shuffles of cards or objects across multiple entities and/or jurisdictions. All entities participating in the shuffle can optionally review the forensic data to ensure that the shuffle was legitimate and that no other entity prematurely peeked at another entity's private hand.

11 Claims, 11 Drawing Sheets

(56) References Cited

U.S. PATENT DOCUMENTS

| | | |
|---|---|---|
| 2006/0154715 A1 | 7/2006 | Black et al. |
| 2008/0234024 A1 | 9/2008 | Connors et al. |
| 2008/0287176 A1* | 11/2008 | Bennett, III ........... G07C 15/00 463/17 |
| 2009/0093300 A1 | 4/2009 | Lutnick et al. |
| 2011/0087885 A1* | 4/2011 | Lerner .................. H04L 63/065 713/168 |
| 2013/0198063 A1 | 8/2013 | Murray |
| 2014/0243078 A1 | 8/2014 | Tarantino |

* cited by examiner

METHOD AND SYSTEM FOR PROVIDING A SECURE SHUFFLE OF GAME OBJECTS ACROSS MULTIPLE ENTITIES

PRIORITY CLAIM

The present invention claims priority to U.S. Provisional Application No. 61/952,303, filed Mar. 13, 2014.

BACKGROUND OF THE INVENTION

The present invention relates to Internet-based games played by a plurality of competing individuals or entities, and more particularly to Internet games involving shuffles of objects or cards across multiple entities, wherein the shuffle remains secure from unauthorized rearrangement of the shuffle, as well as unauthorized peeking at other players' hands. These secure shuffle methods and systems may be used to verify the authenticity of said shuffles after play and thereby function as a forensic tool ensuring valid play.

BACKGROUND

United States Internet gaming is still in its infancy. Currently, three states have legislated card playing (e.g., poker) within their borders. All three of these states are now offering live gaming on the Internet with poor results. For all three states, having enough players to sustain an interactive Internet game requiring a quorum of play has been problematic. Having a real time quorum of players required before Internet play can commence creates problems for smaller gaming jurisdictions with impatient players exiting before a quorum can be achieved. Additionally, larger gaming jurisdictions may still suffer the same player liquidity by allowing a multiplicity of competing gaming companies to operate within their borders.

Interstate gaming agreements are generally viewed as the best method of increasing the pool of players available at any time and therefore the best solution to player liquidity for games requiring a quorum. However, the significant differences in the regulations, and consequently approaches taken by different jurisdictions regarding Internet gaming, make reaching an overall agreement for sharing a player and associated gaming format across state/jurisdictional lines problematic at best.

For example, legalized Nevada and New Jersey Internet gaming (iGaming) licenses are tied to casinos physically located within those states, wherein there is no such restriction in Delaware. In another example, Internet gaming licensing in Nevada requires that all iGaming servers be located within the state's geographical boundaries unless given an exemption from the chairman of the Nevada Gaming Board; however, New Jersey specifies that all iGaming servers must reside within its geographical boundaries with no exemptions.

Aside from the daunting logistical challenges of adopting inter-jurisdictional sharing of players with common games, there remains the problem of each jurisdiction/state ensuring that its players are playing a fair game when dealing with jurisdictions and associated gaming operators outside of its control. Additionally, there are security concerns about unauthorized prediction of shuffles as well as peeking at other player's (assumed concealed) hands even within one gaming organization/operator.

Given the varying licensing requirements implemented by the various jurisdictions permitting iGaming, allowing for a pooling of available players to satisfy a quorum would be inherently complex and cumbersome, especially when each jurisdiction strives to ensure the fairness and security of a game for their players. Furthermore, within each jurisdiction there may be a multiplicity of iGaming providers that are also reluctant to share their players with an untrusted quorum, not to mention concerns over which entity controls the actual shuffle of cards/objects in the game.

The relatively short history of Internet gaming is already wrought with examples of cheating by insiders or players, even with just one operator. For example, the poker site www.AbsolutePoker.com famously had an insider that was able to examine, in real time, the hands of the other poker players he was playing against without their knowledge. By most reports, this fraud was going on for at least six months before it was detected. Another example was the Internet site www.PlanetPoker.com that publicly displayed its shuffling algorithm in an attempt to advertise how fair its game was to any interested players. However, in the publicly displayed source code, the call to randomize was included to produce a random deck before each deck was generated. This implementation, built with Delphi 4, seeds the random number generator with the number of milliseconds since midnight according to the system clock of the host server. This means players outside of the organization easily predicted the output of the random number generator. By synchronizing a player's personal computer clock with the clock on PlanetPoker.com, the outside computer program can calculate the exact shuffle. Thus, the outside player knew all the cards that have yet to appear, everyone's hand, and who will win. This fraud, while unintended by the operator, still allowed some outside players to gain an unfair advantage over others.

There are multiplicities of digital card shuffling algorithms already in the public domain. However, none of these algorithms addresses the vexing problem of maintaining security and integrity across a multiplicity of computing entities. Additionally, none of these algorithms enable various jurisdictions to share their players with other jurisdictions over a common game with assurances the gameplay is fair.

Therefore, it is highly desirable to develop methodologies to ensure the integrity and security of a common shuffle across multiple entities and jurisdictions participating in a quorum. Ideally, these methodologies should not only protect both against unauthorized card/object manipulations by any player, but also protect against any player knowing the cards/objects held in secret by another player.

SUMMARY OF THE INVENTION

Objects and advantages of the invention will be set forth in part in the following description, or may be obvious from the description, or may be learned through practice of the invention.

Methodologies are proposed to ensure the integrity and security of digital shuffles of cards or objects across multiple entities and/or jurisdictions. The methodologies disclosed herein thereby verify the authenticity and legitimacy of the shuffle to all participating entities. Additionally, the methods disclosed also enable a forensic audit by any outside party after the shuffle has occurred.

Shuffles produced by the present methods are created using specified protocols across varying computing platforms where knowledge between the participating entities is shared at specified intervals. The methodologies and systems disclosed herein enable enhanced shuffle security with minimal increase in cost, as well as no detrimental impact on the player's play or transaction experience.

Described are a number of computing mechanisms that provide practical details for reliably producing secure shuffles across multiple jurisdictions and entities ultimately culminating with a digital audit trail. Although the examples provided herein are primarily related to Internet games (iGames), it is clear that the same methods are applicable to any type of shuffling of digital objects across multiple entities.

DETAILED DESCRIPTION

Reference will now be made in detail to examples of the present invention, one or more embodiments of which are illustrated in the figures. Each example is provided by way of explanation of the invention, and not as a limitation of the invention. For instance, features illustrated or described with respect to one embodiment may be used with another embodiment to yield still a further embodiment. It is intended that the present application encompass these and other modifications and variations as come within the scope and spirit of the invention.

Ensuring the security of a shuffle across multiple jurisdictions where there is no trusted party requires both segmentation and synchronized release of information. By controlling both the game information available to each entity in a quorum, as well as the timing of when the information is available for group disclosure, a secure shuffle can occur that is both protected from alteration of the intended shuffle as well as unauthorized peeking at other players secret set of objects—e.g., card hands.

In the context of this invention an "entity" can be defined as a digital computer server associated with a jurisdiction. Thus, each "entity" could be a separate jurisdiction with at least one player within each jurisdiction playing the game in the quorum. Alternatively, an "entity" can also be an individual player's Internet device (e.g., computer, iPad, smartphone, etc.) interacting directly with both the player and the gaming quorum.

An "entity" may also be a separate computing server managed by a jurisdiction or host not participating in the game quorum, but serving only as a "global issuer." Of course, an "entity" within the gaming quorum could also be the "global issuer" having the dual functionality of both "global issuer" and "entity" participating in the gaming quorum. In this case, it is desirable that the assignment of which "entity" in the gaming quorum also functions as "global issuer" changes from game hand to game hand.

Reference will now be made to one or more embodiments of the system and methodology of the invention as illustrated in the figures. It should be appreciated that each embodiment is presented by way of explanation of aspects of the invention, and is not meant as a limitation of the invention. For example, features illustrated or described as part of one embodiment may be used with another embodiment to yield still a further embodiment. It is intended that the invention include these and other modifications that come within the scope and spirit of the invention.

Figure 1:
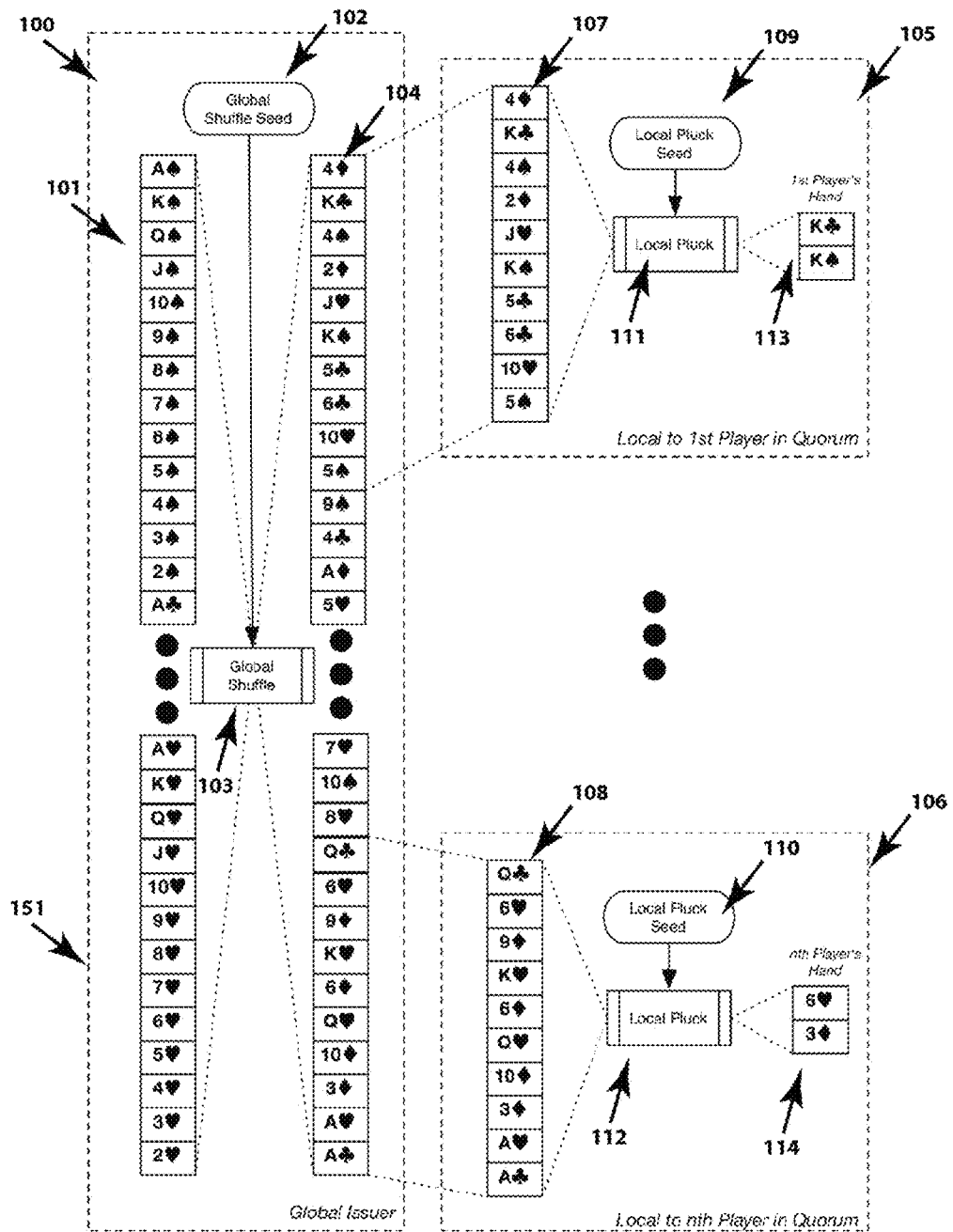
FIG. 1 is a block diagram providing a graphical overview of a first embodiment as applied to the popular poker game Texas Hold'em.

Probably the easiest to understand embodiment of secure shuffles via information segmentation and releases is provided in FIG. 1. Illustrated in FIG. 1 is a conceptual block diagram 100 that begins with a predefined array 101 of objects that will be shuffled into various shuffled subsets by a global issuer 151 who distributes the sub-shuffles 107 and 108 to the entities/players of the game's quorum. As illustrated in FIG. 1 the predefined array 101 is comprised of the 52 indicia of a standard card deck that will be shuffled for a game of Texas Hold'em; however, as is understood by one skilled in the art the array of cards 101 and the game of Texas Hold'em are merely one possible example of this embodiment with other games and objects to be shuffled (e.g., straight poker, dice, baccarat, etc.) possible.

In block diagram 100, algorithm 103 shuffles the predefined array of 52 playing cards 101 based on global shuffling seed 102. The exact structure of shuffle algorithm 103 is irrelevant and any one of the myriads of public domain shuffling algorithms may be employed for this purpose so long as the shuffling algorithm uses an initial seed 102 to determine the final shuffled order of the cards/objects 104. It should be noted that the structure of shuffle algorithm 103 can be known to all entities of the game without compromising the security of the system and in some cases security is actually enhanced with all entities having knowledge of shuffle algorithm's 103 functionality. However, in this embodiment, keeping shuffle seed 102 secret from the other entities until after the game is completed is necessary to maintain the security of the system. In this embodiment, shuffle seed 102 is determined by the global issuer responsible for the shuffle. Global issuer 102 also is responsible for verifying the integrity of the entire game.

After the global initial shuffle is completed and the cards (objects) are in a new order 104 the shuffle is divided into sub-shuffles with each entity in the game quorum receiving a sub-shuffle (e.g., 107 and 108) that is preferably unknown to the other entities in the game. These sub-shuffles are a number of cards (objects) taken from the initial shuffle 104 in a predetermined manner such that the entire deck (i.e., complete set of objects) is distributed among all the entities. The exact method of selecting the sub-shuffle is not relevant to the security of the system since the deck of cards (set of objects) were already pseudorandomly distributed by global shuffle algorithm 103 in the generation of the global shuffle 104; however, it is essential for audit purposes that both global shuffle algorithm 103 and the distribution of sub-shuffles logic be available to all participating entities prior to starting the game. For example, as shown in 100, the sub-shuffles predetermined order of distribution is to take the first ten cards (objects) off of the initial shuffle stack 104 and transfer the ten cards 107 to the first entity in the quorum 105. This process is repeated until all n entities 106 in the quorum have received their associated primary sub-shuffles 108 and all cards (objects) are distributed. In games where the number of cards (objects) in the global shuffle 104 is not evenly divisible by the number of players, one or more entities will receive a secondary sub-shuffle comprising the same number of cards (objects) as the primary sub-shuffle plus the remainder.

Once each entity in the quorum (e.g., 105 and 106) have received their respective sub-shuffles, a local pluck seed 109 and 110 that was determined by each local entity is applied to a local pluck algorithm 111 and 112 to produce a final hand (set) that will be held in secret by the player during the course of the game. Notice that the final hand was derived from the sub-shuffle and would remain unknown to any other entity or player in the game so long as the local pluck seed 109 or 110 remains unknown. This would be true even if the exact structure of each sub-shuffle was known by all the other entities or players in the game quorum. Thus, a significant part of the security stopping one player or entity from peeking at another player or entities' hand is derived from the locally generated nature of the pluck seeds 109 and 110.

Like the global shuffle 103, the exact structure of the pluck algorithm 111 and 112 is irrelevant to the security of the system so long as the pluck algorithm 111 and 112 is repeatable with the same seed and is unpredictable so long as the seed is unknown. For example, in one embodiment the pluck algorithm 111 and 112 could be a shuffle algorithm reshuffling the sub-shuffle 107 and 108 where the first cards of the reshuffle become the player's hand 113 and 114.

In block diagram 100 there are only two cards (113 and 114) in the final hand (set), which is compliant with the rules of Texas Hold'em; however, other size sets are possible and necessary for different games—e.g., five cards for classic Poker. Therefore, the number of cards (objects) in the final hand (set) will vary depending on the game as well as the number of cards (objects) in each sub-shuffles depends on the number of entities in the quorum.

For example, since block diagram 100 is for a game of Texas Hold'em and assuming n=5 entities there will be four primary sub-shuffles of ten cards each with one secondary sub-shuffle having twelve cards to completely distribute the 52 cards in a standard playing deck. From these distributed sub-shuffles each entity will pluck two cards for their final hand. Thus, for the four primary entities receiving ten cards per sub-shuffle there are 45 possible hands with the one secondary entity receiving 12 cards in its sub-shuffle having 66 possible hands. If the previous example is changed to another game (e.g., straight poker) requiring five cards in a hand with n=5 entities in the quorum, there will be 252 possible hands for the four entities receiving primary sub-shuffles with ten cards and 792 for the other entity with the secondary sub-shuffle of twelve cards.

Since the security against peeking in this embodiment is provided by the local pluck 111 and 112 remaining unknown to the other entities at the time of game play, the number of objects in the sub-shuffle 107 and 108 and the local pluck 111 and 112 for the private hand 113 and 114 obviously affects the number of possible final hand (set) combinations that can be guessed by an attempting cheater—assuming the cheater has complete knowledge of the sub-shuffles sent to every entity in the quorum. Thus, for security to be maintained in this embodiment, the number of combinations of possible final set (hands —113 and 114) derived from the local shuffles 111 and 112 must be sufficiently large that it would be impractical to attempt to gain an advantage by guessing which hand an entity actually held. This actual quantity is difficult to speculate, however it may be reasonably assumed that any number of possible private hands (sets) for each entity of ten or higher would be too cumbersome for a cheater to gain any advantage guessing from the possible hands (sets) on a consistent basis.

Fortunately, for most common card games using the standard 52 card deck the number of possible sets for each entity almost always exceeds 10—see table below. In the table, '$S_1/S_2$' denotes the number of objects in the primary ($S_1$) and secondary ($S_2$) sub-shuffles. The slash in the entries in the game row denotes the number of combinations for the given number of players, game type, and number of objects associated with the two sub-shuffles—i.e., primary and secondary.

As listed in the table there are only two configurations in two types of games, highlighted in shading, where the number of combinations for all entities falls below ten—i.e., 8 and 9 players per game with 5 cards per hand. These special cases could be dealt with by simply forbidding any game requiring 5 cards (objects) from having more than seven players. It should also be noted that for simplicity the below table displays the entire remainder given to one entity, other distributions of the remainder (e.g., two entities in a five player quorum playing Texas Hold'em could each receiving one remainder card) are possible and in some cases more desirable.

|  | Number of Entities (Players) in the Game | | | | | | | |
|---|---|---|---|---|---|---|---|---|
| Game $S_1/S_2$ | 2<br>26/0 | 3<br>17/18 | 4<br>13/0 | 5<br>10/12 | 6<br>8/10 | 7<br>7/10 | 8<br>6/8 | 9<br>5/16 |
| Texas Hold'em (2 Cards) | 325/0 | 136/153 | 78/0 | 45/66 | 28/45 | 21/45 | 15/28 | 10/120 |
| Straight Poker (5 Cards) | 65,780/0 | 6,188/8,568 | 1,287/0 | 252/792 | 56/792 | 21/252 | 6/56 | 1/4,386 |
| Draw Poker | 65,780/0 | 6,188/ | 1,287/0 | 252/792 | 56/792 | 21/252 | 6/56 | 1/4,386 |

|  | Number of Entities (Players) in the Game | | | | | | | |
|---|---|---|---|---|---|---|---|---|
| Game $S_1/S_2$ | 2 | 3 | 4 | 5 | 6 | 7 | 8 | 9 |
|  | 26/0 | 17/18 | 13/0 | 10/12 | 8/10 | 7/10 | 6/8 | 5/16 |
| (5 Cards) 7 Card Stud Poker (3 Cards) | 2,600/0 | 8,568 680/816 | 286/0 | 120/220 | 56/220 | 35/120 | 20/56 | 20/560 |

To ensure that each entity is performing a fair pluck (i.e., not deliberately picking the best cards in the given sub-shuffle), it is essential that each entity registers its pluck seed with the issuer of the global shuffle 104 before receiving a sub-shuffle. However, at the same time to ensure that the issuer does not gain knowledge of an entity's hand during the game, the exact nature of each entity's local pluck seed cannot be transmitted in plaintext. Rather, each entity's pluck seed could be transmitted encrypted in cipher text with the decryption key only transmitted after the hand of the game is completed. In a preferred embodiment, a cryptographic hash (e.g., SHA—Secure Hash Algorithm) of each entity's pluck seed can be safely transmitted to the issuer prior to receiving a sub-shuffle. While this hash must be transmitted before the entity receives its sub-shuffle, for bandwidth efficiency the pluck seed hash need not be transmitted before each shuffle of a game hand. Rather, a block of sequential pluck seed hashes could be transmitted to the issuer at the start of the game quorum formation with the next hash in the sequence being used for each subsequent game hand.

Figure 2:
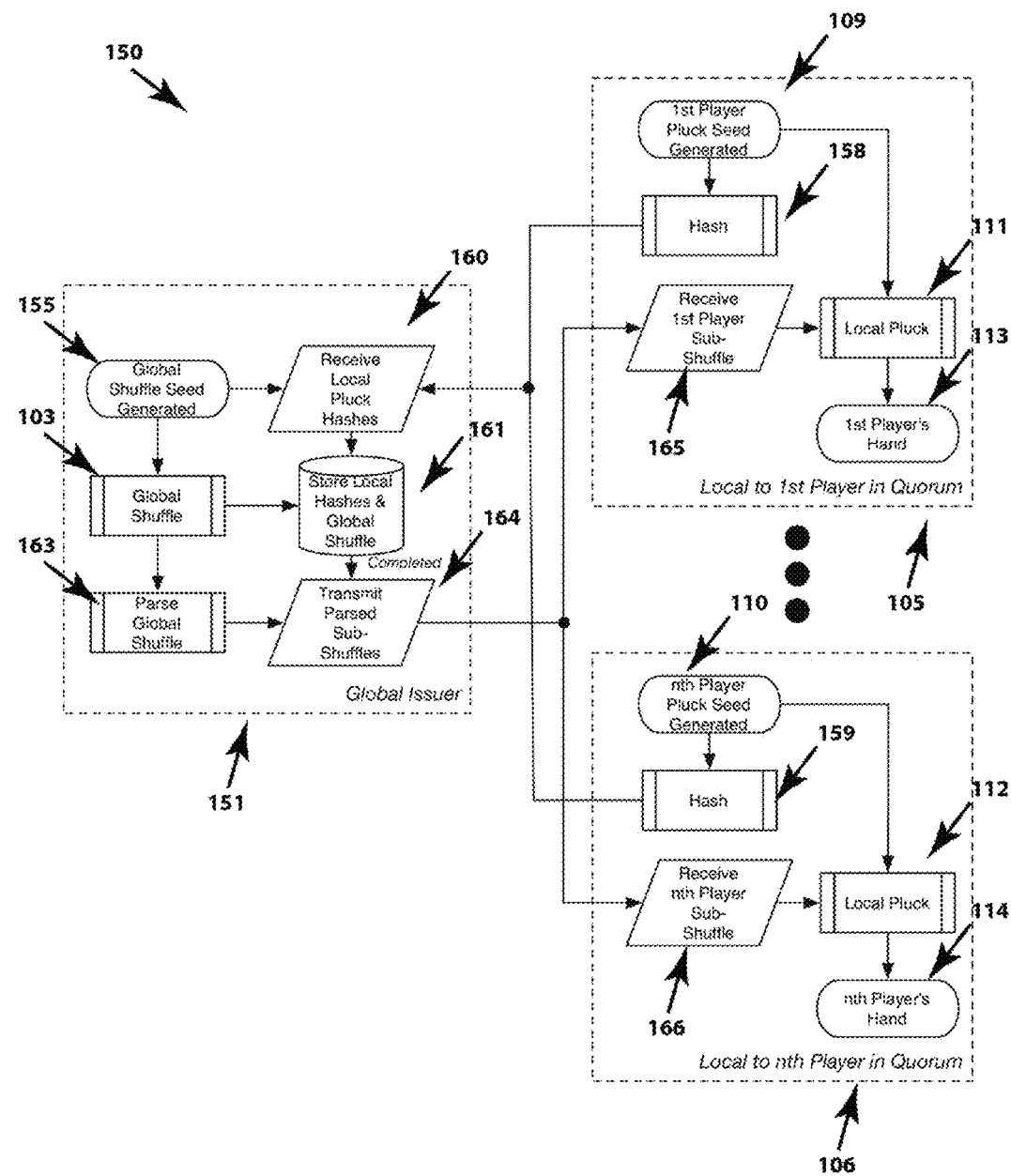
FIG. 2 is a flow chart of the information exchanged between the various entities prior to initiating the local (individual) shuffles of FIG. 1.

In any case, the flowchart for transfer of each entity's pluck seed hash is illustrated in FIG. 2 as embodiment 150. As illustrated in 150, when or before global issuer 151 generates the global shuffle seed 155, all the entities in the game quorum 105 and 106 transmit a hash 158 and 159 of their generated pluck seeds 109 and 110), which are received 160 by the global issuer 151. When all of the hashes are received from all the entities in the game quorum, the hashes are saved 161 with either the result of the global shuffle 103, or the global shuffle seed 155, or both. Prior to all hashes being received 161, the global issuer 151 can parse 163 the global shuffle into sub-shuffles. However, the resultant sub-shuffles cannot be transmitted 164 to the associated entities in the game quorum until all hashes have been received and logged. Once all hashes are received and logged 161 and the respective sub-shuffles are transmitted 164 and received 165 and 166 by each entity in the gaming quorum 164, the local plucks 111 and 112 can commence with each entity resulting in a player's private hand 113 and 114 for each entity as shown in FIG. 1.

After the private individual players hands have been selected, in most card games and the example of Texas Hold'em in particular, there is the possibility of subsequent cards being drawn as part of the game hand. The problem being that if each entity in the game quorum has secretly selected their hand independent of the issuer there is no one source available to dispense draw cards with confidence that the same card has not already been used in a private hand in the game quorum.

Figure 3:
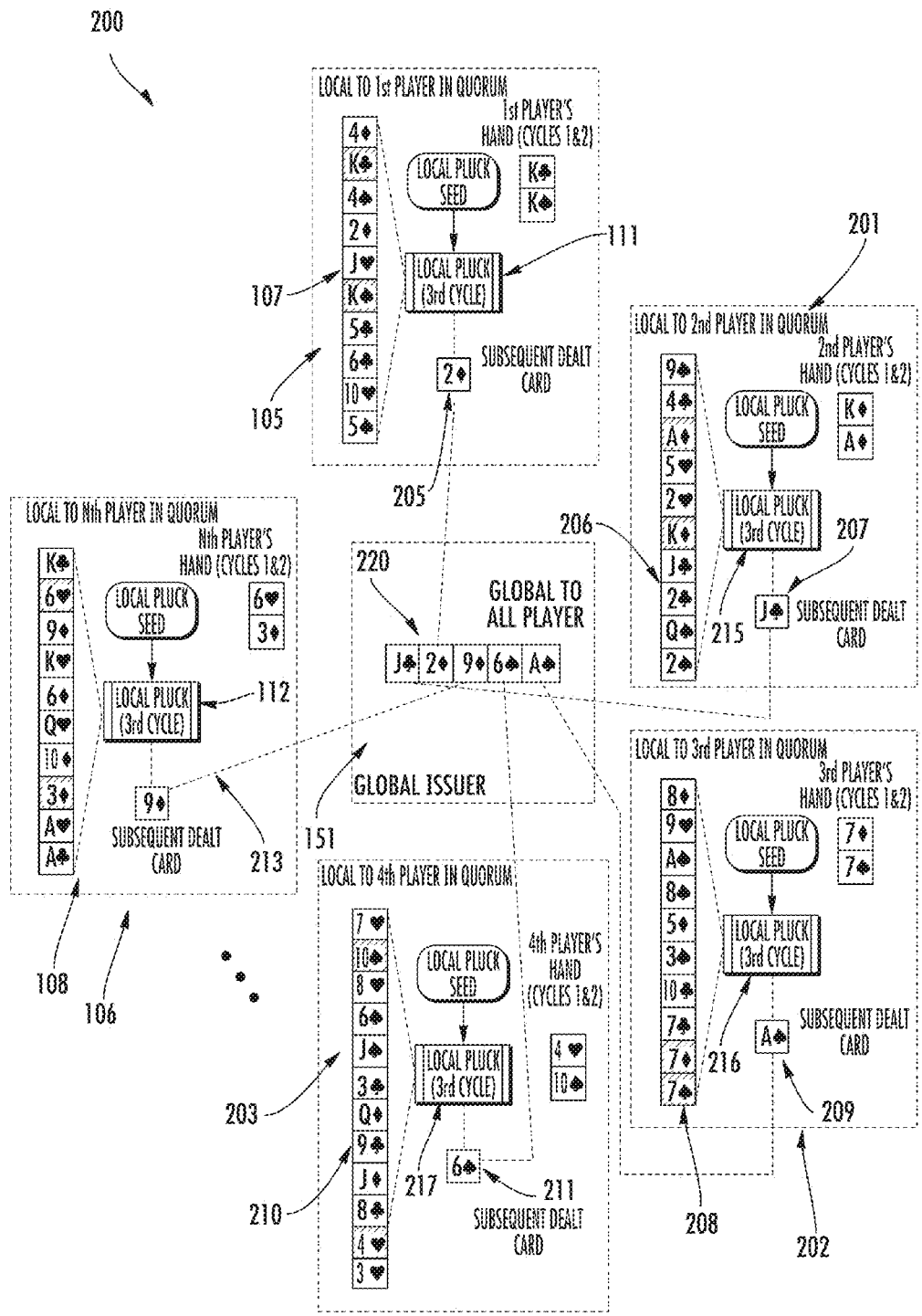
FIG. 3 is a block diagram providing a graphical overview of subsequent cards dispensed after the initial shuffles of FIG. 1.

FIG. 3 illustrates an embodiment 200 where the problem of subsequent draw cards that are assured to not also be present in any entity's private hand is solved by the various entities in the gaming quorum contributing draw cards. For the purposes of instruction and clarification five entities 105, 106, 201, 202, and 203 are illustrated in embodiment 200 of FIG. 3. However, it should be understood that the embodiment of 200 would work equally well with other numbers of entities participating in the gaming quorum.

Within each entity's domain there is a priori knowledge of the sub-shuffle set of cards 107, 108, 206, 208, and 210, as well as the two cards selected for the entity's private hand. Thus, it is possible for each entity to select an additional card 205, 207, 209, 211, and 213 from their respective sub-shuffle 107, 108, 206, 208, and 210 that has not been previously selected for their private hand. As illustrated in embodiment 200, the same local pluck algorithm (i.e., 111, 112, 207, 209, and 211) with the same local pluck seed that selected the entity's private hand can simply be iterated an additional cycle to produce a subsequent dealt card 205, 207, 209, 211, and 213 for each entity. These subsequently dealt cards 205, 207, 209, 211, and 213 can then be transmitted to a global issuer 151 to form the subsequent draw cards 220 available for the quorum game hand.

In a preferred embodiment, the global issuer pseudorandomly selects the order of which subsequently dealt card 205, 207, 209, 211, and 213 becomes the next draw card in the quorum game hand 220 with two sequential draw cards from the same entity (with the local pluck algorithm iterated another cycle) being a possibility. This embodiment has the advantage of no entity having a priori knowledge of the subsequent draw card for the quorum hand 220 and altering their betting strategy accordingly. It should be noted that even if an entity is no longer participating in a particular game hand (e.g., the entity folded in a poker game), the entity should still be utilized as a possible source for draw cards. To ensure that the pseudorandom sequence of quorum draw card entity selection remains both unpredictable and auditable, the seed for the pseudorandom entity selection for a subsequent draw card dispersion algorithm could be derived from human decisions during game play—e.g., total of all bets made and time tag in milliseconds of when the final bet was made with the resulting seed logged for forensic purposes.

Figure 4:
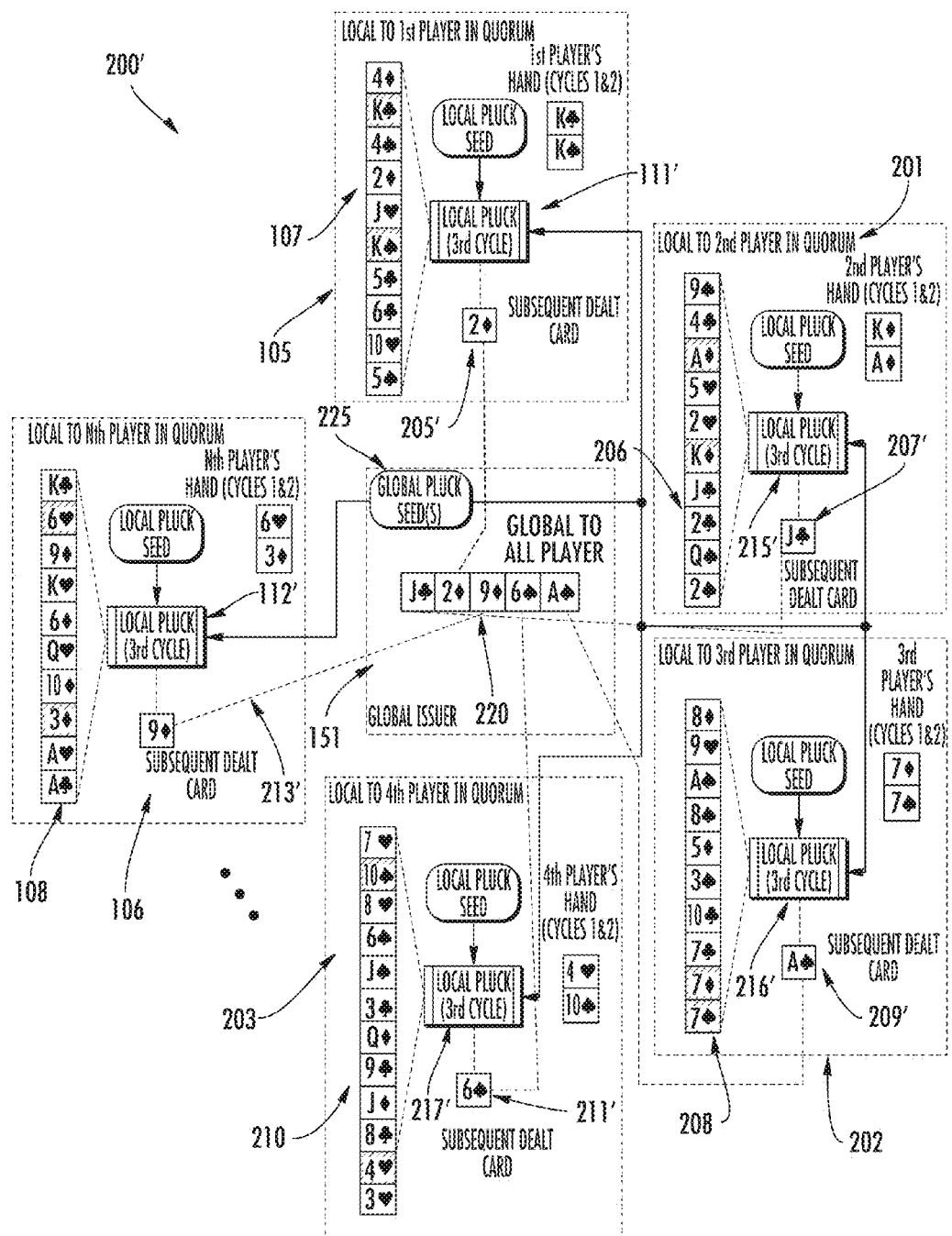
FIG. 4 is a block diagram providing a graphical overview of subsequent cards dispensed after the initial shuffles of FIG. 1 wherein the global issuer ensures that no entity can anticipate a future draw card.

Thus, even in the preferred embodiment each entity still has knowledge of their next candidate draw card 205, 207, 209, 211, and 213 and may still attempt to develop a strategy on betting based on the possibility of their candidate draw card becoming the next actual global draw card. While with larger numbered quorums the effectiveness of this strategy is questionable, in smaller number quorums (e.g., only two entities playing in a game hand) this strategy may become more practical. Fortunately, the embodiment 200' of FIG. 4 provides an effective countermeasure to this cheating strategy especially in quorums with a small number of entities. As illustrated in 200', the sub-shuffles 107, 108, 206, 208, and 210, as well as local hand selection, would still function as previously described; however, before any entity 105, 106, 201, 202, and 203 executed its local pluck algorithm 111', 112', 215', 216', and 217' for a draw card, it must first receive a new pluck seed 225 from the global issuer 151. Once received, the entity 105, 106, 201, 202, and 203 would apply the new pluck seed 225 to its local pluck algorithm 111', 112', 215', 216', and 217' to generate the next draw card 205', 207', 209', 211', and 213' to the global hand 220. Notice that the new pluck seed 225 is only transmitted to the entity at the same time the global issuer notified the entity to provide the next draw card 205', 207', 209', 211', and 213' to the global hand 220. Thus, no advantage can be gained since the entity providing the next draw card 205', 207', 209', 211', and 213' would only have knowledge of the card milliseconds before the other entities and the resultant draw card is dispensed at a time when betting is suspended. Of course, in this embodiment, since a new seed is provided to the local pluck algorithm 111', 112', 215', 216', and 217', an added process would have to be included to ensure that the resulting next draw card 205', 207', 209', 211', and 213' was not previously selected from the entity's sub-shuffle 107, 108, 206, 208, and 210 for use in a local hand. Optionally, the global pluck seed 225 transmitted to each entity could be algorithmically combined with the entity's local pluck seed (e.g., modulo added, exclusive-OR, etc.), thereby ensuring the global issuer also has no knowledge of the resulting next draw card 205', 207', 209', 211', and 213' in addition to the entity plucking the draw card.

Figure 5:
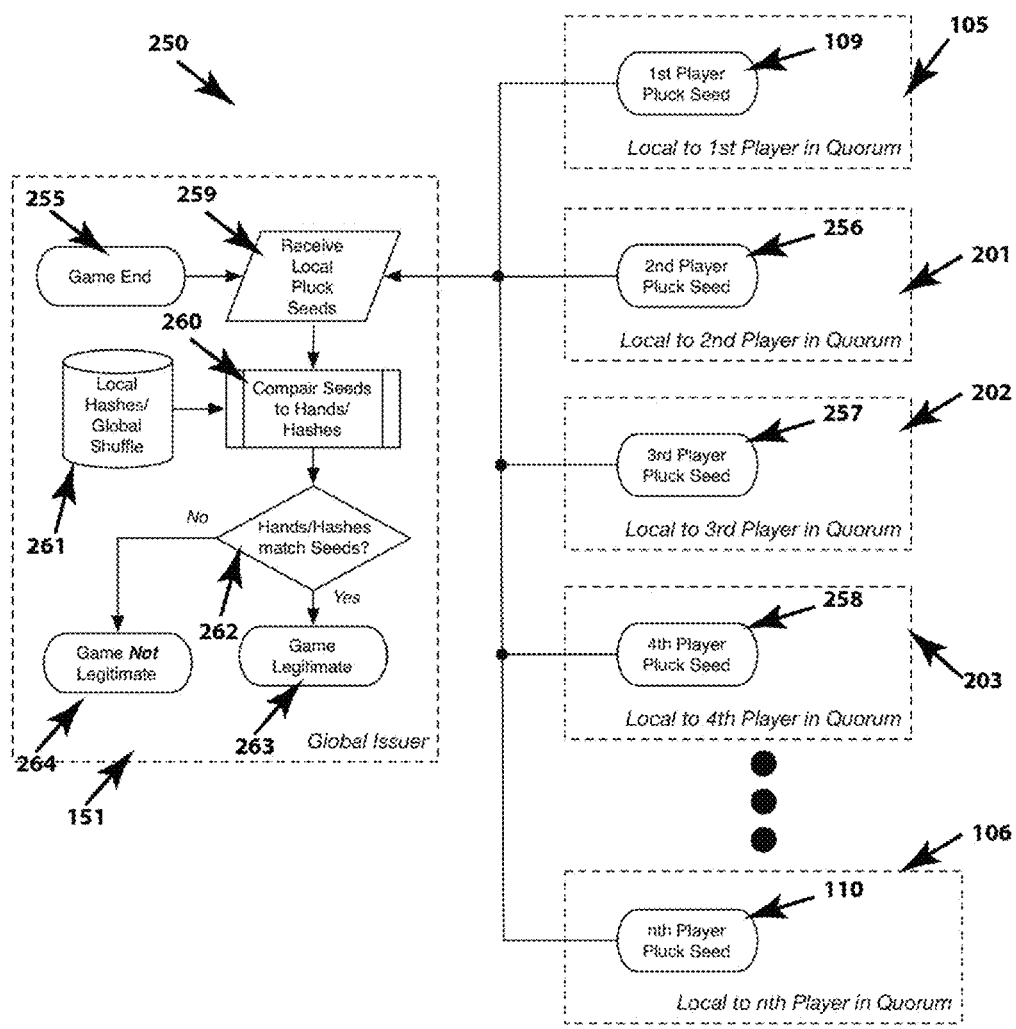
FIG. 5 is a flow chart of the information exchanged after the play is completed from the shuffles of FIG. 1, FIG. 3, and FIG. 4.

After each hand is played and a winner determined, it is then necessary to reconcile the hand to ensure that all entities in the quorum acted legitimately. Embodiment 250 of FIG. 5 illustrates one possible method of conducting this reconciliation. As shown in 250, the various entities 105, 106, 201, 202, and 203 participating in the gaming hand quorum pass their respective pluck seeds 109, 110, 256, 257, and 258 in clear text 259 to the global issuer 151 at the conclusion of the game hand 255. Once all of the clear text pluck seeds 109, 110, 256, 257, and 258 are received, the global issuer 151 compares 260 the clear text pluck seeds 109, 110, 256, 257, and 258 to the previous received hashes or cipher text 161 that were transmitted from the same entities before the start of quorum game hand play, as well as ensure that the clear text pluck seeds result in the same private hand cards played by a given entity. If the clear text pluck seeds 109, 110, 256, 257, and 258 compute 262 to the same hashes/cipher texts received at the start of the quorum game hand 161, then the quorum game hand is certified legitimate 263 and subsequent hands can be played without concern. Conversely, if the clear text pluck seeds 109, 110, 256, 257, and 258 compute 262 to different hashes/cipher texts than were received at the start of the quorum game hand 161, then the quorum game hand is not legitimate 264 and the hand is flagged for further review. In the event the hand is calculated to be not legitimate 264, then exact action performed at that time will vary depending on business decisions. For example, further play may be stopped until the discrepancy is resolved, or possibly one illegitimate hand may not stop ongoing play but still be subjected to a future audit.

Thus, by partitioning quorum game play information to various entities with information only shared at specific times, no one entity in the gaming quorum (including the global issuer) has a priori knowledge of the other entities' private hands. While each entity does possess some knowledge of cards that cannot be in other entities hands, the fluctuations from hand to hand, as well as the number of cards in each sub-shuffle, make developing a cheating strategy based on only this information inconsistent and consequently not economically feasible on a reliable basis.

Figure 6:
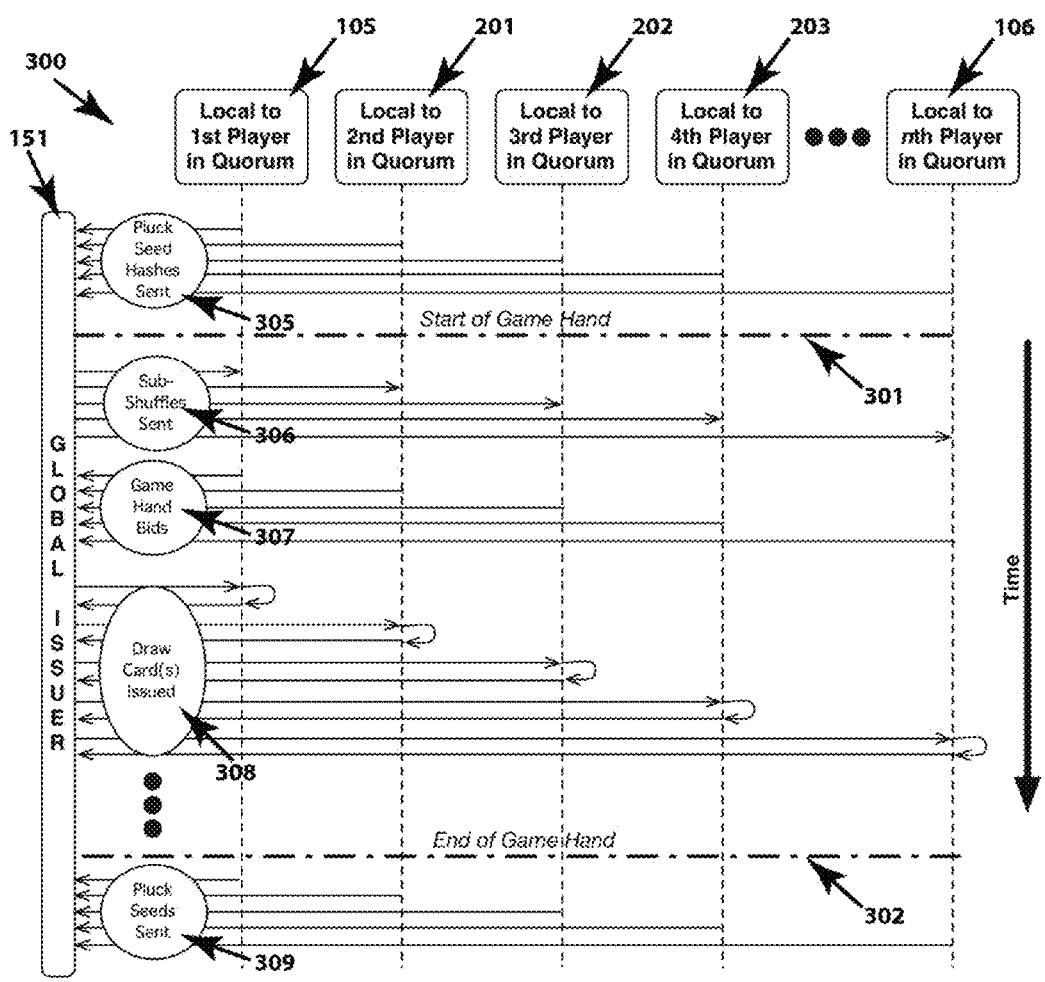
FIG. 6 is a two-dimensional time line illustrating how information segmentation is achieved with respect to time of FIG. 1 through FIG. 5.

FIG. 6 illustrates a two-dimensional time line 300 diagrammatically illustrating how game play information is partitioned relative the various entities with respect to time. In FIG. 6, time flows from top to bottom with the various entities 105, 106, 201, 202, and 203 in the gaming quorum illustrated in a horizontal row across the top of 300 and the global issuer 151 shown vertically on the left-hand side of 300. As previously discussed, in some embodiments, the global issuer 151 can also physically be an entity 105, 106, 201, 202, and 203 in the gaming quorum; however, for the purposes of clarity of FIG. 6 the global issuer 151 functionality is illustrated separately.

At the top of timeline 300, the entire process is shown starting with the various entities 105, 106, 201, 202, and 203 in the gaming quorum all transmitting cryptographic hashes of their associated pluck seeds 305 to the global issuer 151. As previously stated, these various hashes can be transmitted in groups covering multiple quorum game hands, the significant point being that hashes are received 305 by the global issuer 151 from all entities 105, 106, 201, 202, and 203 participating in the gaming quorum prior to quorum game play for the given hand 301.

After the hashes are received 305, the global issuer 151 transmits the assigned sub-shuffles 306 to all entities 105, 106, 201, 202, and 203 in the gaming quorum. Once each entity receives its respective sub-shuffle, its local pluck algorithm utilizes its local pluck seed to select its respective player's private hand. In the example of the game Texas Hold'em, bidding (i.e., call, fold, or raise) between the players in the gaming quorum would then ensue with the various bids optionally transmitted 307 to the global issuer 151 for logging and possible use in selecting which entity would pluck a subsequent draw card and/or draw card global seed generation.

After the first round of bidding is concluded, if necessary, the global issuer 151 selects entities in the quorum 105, 106, 201, 202, and 203 to dispense any needed draw cards 308. Once a selected entity (e.g., 105, 106, 201, 202, or 203) receives a request from the global issuer 151, it selects the next draw card and transmits that draw card's identity 308 back to the global issuer 151 for use in the quorum game hand. This process 308 can be repeated until a sufficient number of draw cards are generated for the given stage of the game hand—e.g., three draw cards for the flop in Texas Hold'em. At this point, the bidding 307 and draw card issuing 308 processes may or may not be repeated depending on game play.

Eventually the quorum game hand will end 302 with one or more players being the winner(s) for that hand. The only remaining information transfer to occur is for all the entities in the quorum 105, 106, 201, 202, and 203 to send their selected pluck seeds 309 to the global issuer 151 to certify that the previous game hand was legitimate by calculating each hash value of the clear text pluck seeds received and comparing the newly calculated hashes to the pluck seed hashes received 305 before the start of the game hand 301. Additionally, the newly received clear text pluck seeds 309 can also be applied to the sub-shuffle that was sent to the associated quorum entity 105, 106, 201, 202, and 203 to ensure that the any cards publicly displayed at the end of game 302 were derived from the sub-shuffle and pluck seed. Since the game hand is concluded 302, the secrecy of the clear text pluck seeds is no longer of any concern.

While the previous embodiments ensure security and privacy for each entity's private card hand, most of these embodiments do have the problem of each entity having potential knowledge of a limited number of cards that the other entities cannot have. While it is at most questionable that this knowledge could impart an unfair advantage bidding or calculating the odds of winning a draw on an economically reliable basis, it is fair to say that this potential knowledge is an undesirable artifact of the previous embodiments.

Fortunately, with the use of a modified Linear Congruential Generator (LCG) or similar type algorithm to perform shuffle/pluck functions, the problem of each entity having a priori knowledge of a sample of cards that the other entities cannot have can be greatly reduced or eliminated. A LCG is an algorithm that yields a sequence of randomized numbers calculated with a linear equation. A LCG is fast, and more to the point, accepts a starting seed that causes the LCG to pseudorandomly select numbers over a given period while never repeating the same number so long as the period is not exceeded. For example, most common LCG algorithms' periods are $2^{32}$ (i.e., 4,294,967,296). Thus, with most 32-bit LCG algorithms, over four billion unique pseudorandom numbers can be selected before the algorithm repeats itself. By mapping a LCG output to a set of objects, the pseudorandom jumping nature of the LCG algorithm allows for unpredictable selections of objects from the set (i.e., shuffle and pluck functionality) that is nevertheless completely auditable if the LCG starting parameters are known.

Figure 7:
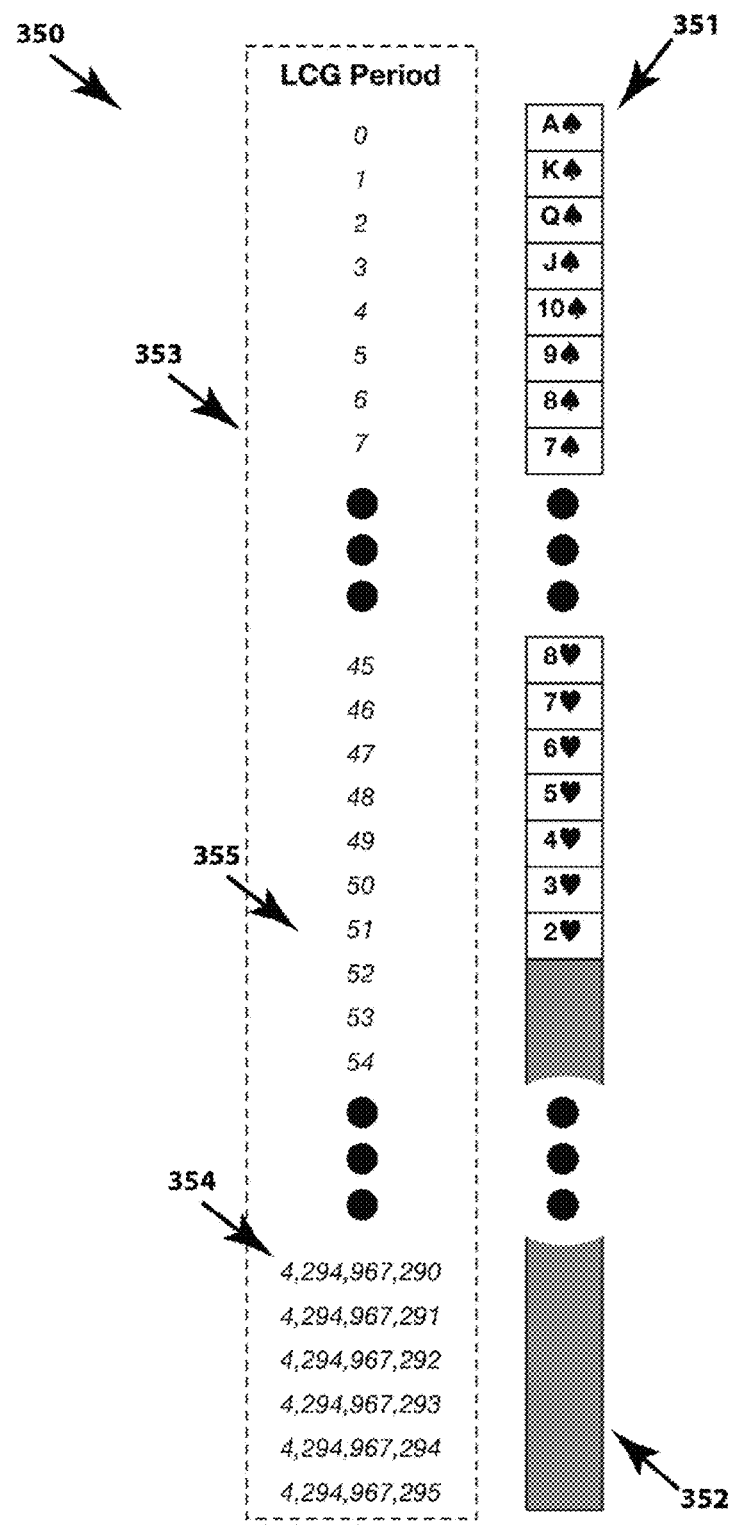
FIG. 7 is a block diagram providing a graphical overview of a common, 32-bit, Linear Congruential Generator (LCG) mapped to indicia from a standard deck of playing cards.

For example, FIG. 7 provides a conceptual illustration 350 of a period 353 of a 32-bit LCG with 4,294,967,296 numbers in the period before repeating. In 350, the first fifty-two numbers are mapped to the fifty-two cards 351 in a standard deck with the remaining 4,294,967,244 numbers 354 in the LCG period 353 not mapped to anything 352. If this example LCG were utilized as a combination shuffle/pluck algorithm, when the LCG output was between zero and fifty-one (355) a card would be selected from a standard deck. Any other number selected (i.e., 52 thru 4,294,967,295) 354 would return a null selection 352 with no card being selected. In other words, the vast majority of the LCG output numbers result in null with only approximately 0.000012% of the numbers in the period 355 selecting an actual card for a virtual deck. So if one entity were to be assigned an arbitrary starting point in the example LCG period, that entity could easily add a random number less than some value (e.g., one-thousand) to the starting point with very little probability of exhausting the set of fifty-two playing cards over the skipped (i.e., added) portion of the LCG period 353.

However, as a practical manner, even with modern computing power, incorporating a 32-bit LCG is too large a period (i.e., 4,294,967,296 numbers to a period) to enable rapid card selection. To be efficient, the starting parameter m for the LCG should be a power of two—for bit shifting in the CPU (Central Processing Unit). Consequently, a modified LCG can employ a smaller power-of-two-value for m and still offer the same shuffle and plucking functionality. To ensure sufficient obfuscation, making it impractical for other entities to guess a given entity's private hand, it is desirable to seek a LCG value for m (modulus) that yields a period that is at least one-hundred times greater than the number of objects to be shuffled and plucked. So, for the standard fifty-two-card-deck, the minimum value for m should be $2^{13}$, which yields a period of 8,192 cycles assuming the other LCG parameters are correctly selected for maximum period. The upper limit for m is driven by the speed of the CPU and how quickly the complete period can be calculated such that it will not result in an unacceptable delay shuffling and plucking the objects for the gaming quorum. Therefore, the example LCG illustration 350 can be used as the algorithm for card shuffling and plucking for each entity so long as a shorter, more practical, period is programmed into the LCG or similar algorithm.

Regardless of the LCG period, the algorithm would be utilized for shuffling selecting cards (objects) by first receiving a starting pointer in the LCG period and other parameters from a global issuer or another entity. Secondly, the receiving entity would combine a locally selected obfuscation number to the starting pointer—to ensure that the previous entity/issuer would have no knowledge of the actual starting point of the receiving entity by obfuscation. Thirdly, the entity would then sequentially run the LCG algorithm through a number of cycles until a sufficient number of cards were selected for a private hand. Once the private hand was achieved, the same entity could then combine another random obfuscation number to the ending in the LCG private hand selection pointer and pass the newly obfuscated pointer to another entity, thereby ensuring the pointer was sufficiently obfuscated that knowledge of the actual stopping place in the sequence by an outside party would be extremely difficult if not impossible to obtain. Ideally, that when an entity was selecting a private hand, there would be a pseudorandom probability that one or more cards may be skipped to further obscure the actual cards selected for the private hand. For added security, the pseudorandom number combined with the actual end point could also be tested to ensure that it included sufficient cycles that some number of cards could also be skipped. Thus, by repeating this process for each entity in the quorum, it can be seen that, so long as some cards remain for draw cards in the virtual deck, the handoff of an obfuscated pointer to the next entity using the same LCG shuffle and pluck algorithm would ensure that no entity would have a priori knowledge of another entity's private hand.

Figure 8:
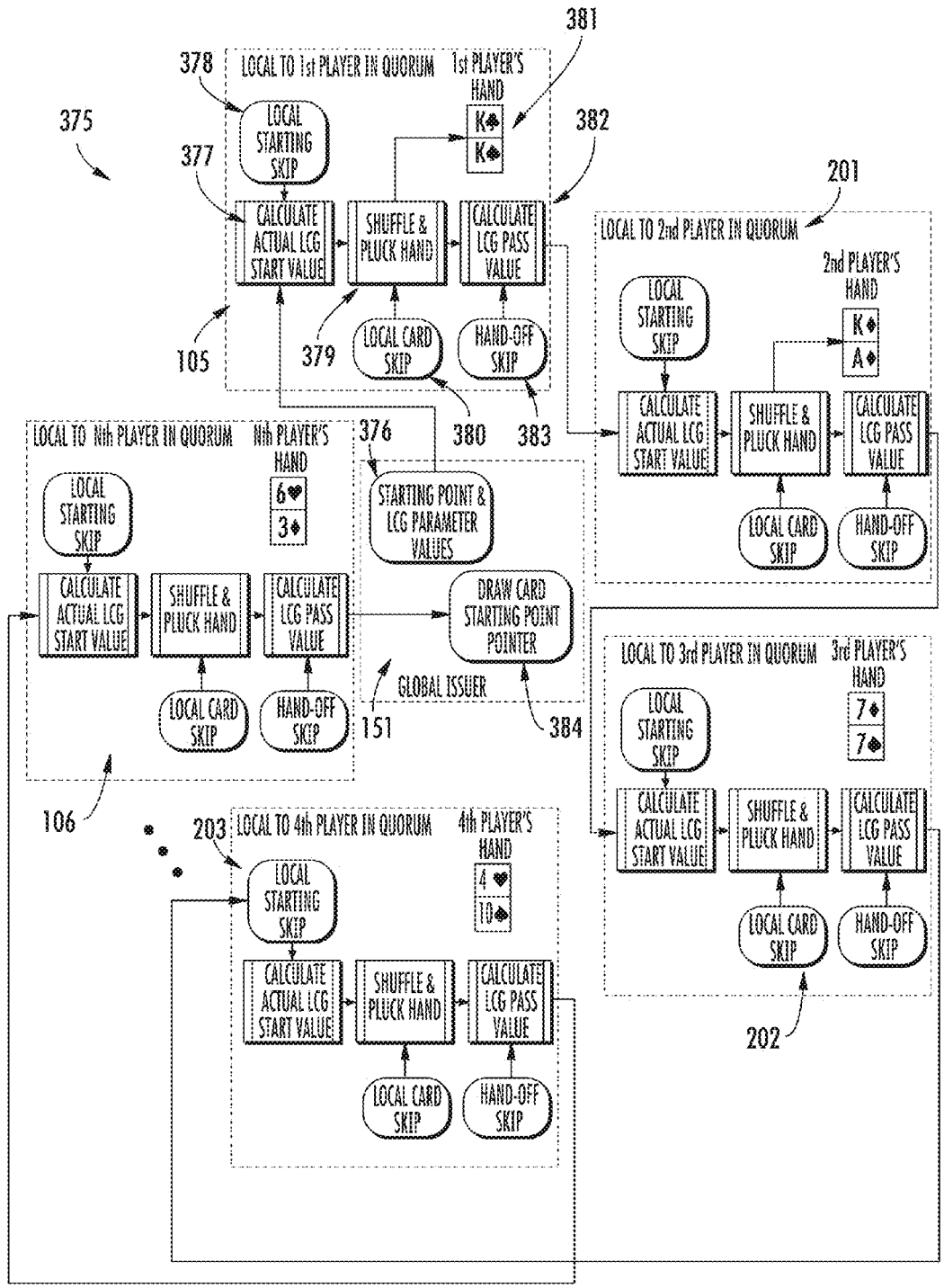
FIG. 8 is a block diagram of a graphical overview of a another embodiment as applied to the popular poker game Texas Hold'em wherein a LCG performs the shuffle and pluck functions for each entity with the global and forensic responsibilities shared among all entities.

For example, FIG. 8 illustrates an embodiment 375 that utilizes a LCG type algorithm common among all of the entities to perform each entity's private shuffle and pluck functionality. As in the previous embodiments, a global issuer 151 initiates the local shuffle/pluck functionality 376 for each entity 105, 106, 201, 202, and 203 where the global issuer could be one of the entities participating in the gaming quorum. However, in this embodiment 375, the local issuer 151 initiates the process by selecting the parameters for the LCG as well as the starting pointer for the LCG period 376 for the first entity 105. These parameters 376 are global and therefore will be known by all entities in the gaming quorum with only the first entity 105 processing the parameters 377 in an LCG type algorithm at this time.

Once parameters 376 are received by the first entity 105, the initial starting point pointer parameter 376 received by entity 105 is combined by an algorithm 377 with an internal skip obfuscation value 378 that was determined by entity 105 prior to receiving the starting point parameters 376 from global issuer 151. The exact structure of algorithm 377 is not important (e.g., modulo adding, exclusive-OR, etc.) so long as the output of algorithm 377 could not be predicted without knowledge of both the initial starting point pointer parameter 376 as well as the internal skip obfuscation value 378—i.e., the actual starting point of the LCG shuffle and pluck algorithm is obfuscated. The output of algorithm 377 is then applied to an internal shuffle and pluck algorithm 379, which optionally can accept another locally generated skip obfuscation value 380 to pseudo-randomize its selection of private hand cards 381 such that the next two sequential cards selected by the LCG algorithm may or may not necessarily become the private hand 381. After the private hand 381 is determined by the shuffle and pluck LCG algorithm 379, the ending point pointer value is then passed to another algorithm 382, which combines the ending pointer value with another locally selected skip obfuscation value 393 to determine the obfuscated value of the ending/starting pointer that is passed to the second entity 201 in the gaming queue. Again, the exact structure of algorithm 382 is not important so long as its output could not be predicted without knowledge of the internal values generated in the first entity 105.

This above process is then repeated with the second 201 and other entities 202, 203, and 106 until every entity in the gaming quorum has selected internal private hands. After the last entity private hand selection is completed, the obfuscated ending point pointer value 384 is sent to the global issuer 151 to become the starting pointer for the draw cards.

Figure 9:
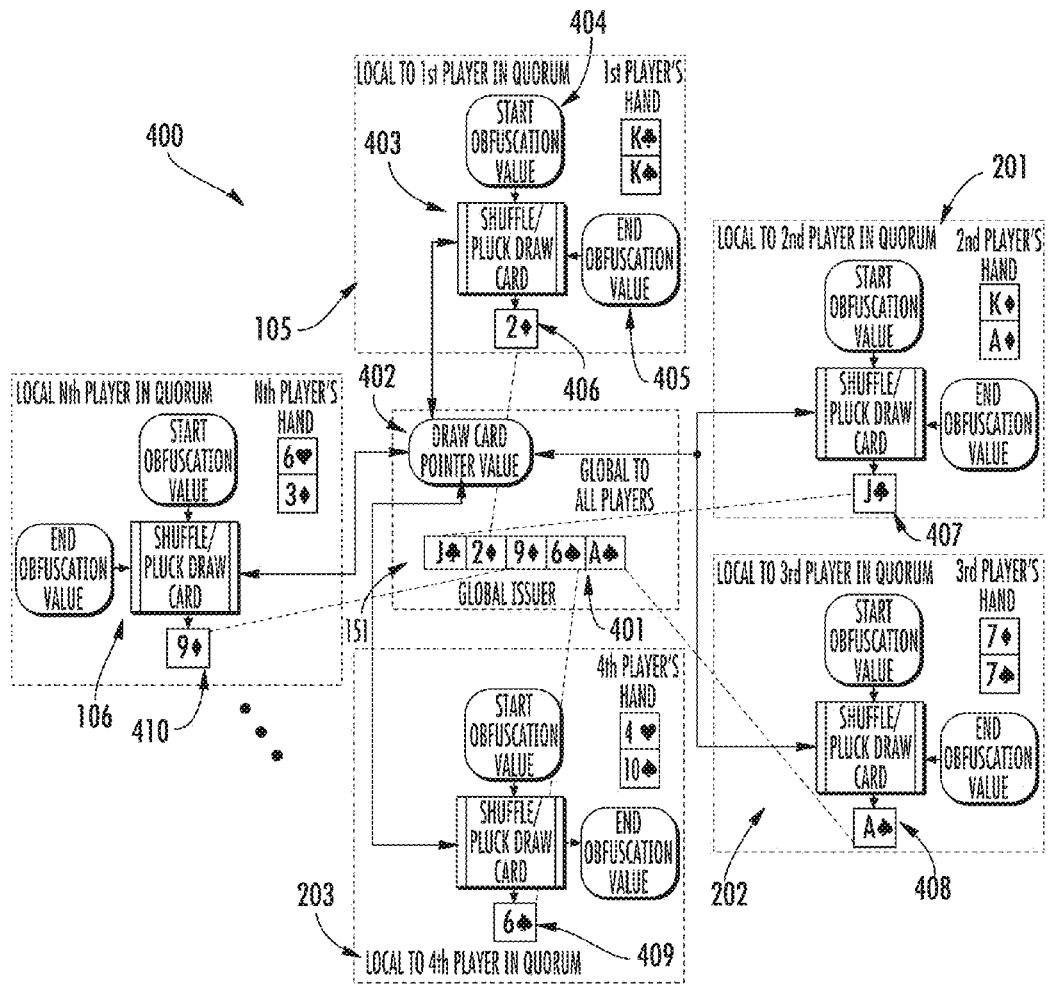
FIG. 9 is a block diagram providing a graphical overview of the embodiment of FIG. 8 wherein draw cards are selected after each entity has selected its' private hands.

FIG. 9 illustrates an embodiment 400 where subsequent draw cards 401 can be generated after private hands were shuffled and plucked by an LCG algorithm while assuring that no subsequent draw cards were also selected for a private hand. Within the embodiment of 400 each entity's domain, there is a priori knowledge of the two cards selected for each entity's private hand. Thus, it is possible for each entity to select an additional card (i.e., 406 thru 410) from any cards that may have been skipped by obfuscation cycles of the LCG during the selection of private hands. However, in LCG type embodiments, the pool of skipped cards will vary from entity to entity and may not include any skipped cards.

In a certain embodiment, the global issuer pseudo-randomly selects the order of which subsequently dealt cards 406 thru 410 will be drawn from each entity. When the global issuer 151 alerts the entity 105 to provide the next draw card in the sequence 405, the global issuer 151 also passes the value of the draw card pointer 402 to the entity 105. For the first draw card, the pointer value 402 will be identical to the pointer value 384 (FIG. 8) received from the final entity in the gaming quorum 106. However, for all other draw cards the pointer value 402 (FIG. 9) will be whatever value was returned from the previous entity that selected a draw card.

Regardless of how the draw card pointer value 402 was determined, the current value is passed to the entity that has been chosen to select the next draw card 401. Once the entity 105 receives the draw card pointer value 402, it applies it to a draw card shuffle/pluck algorithm 403 that also accepts another obfuscation value 404 that was locally generated by the same entity 105 prior to choosing any private hands. This second value 404 applied to the draw card shuffle/pluck algorithm is algorithmically combined 403 with the received draw card pointer value 402 to produce the actual shuffle/pluck value used by the entity 105 and then determines the draw card either from cycling through from the pointer 402 received or by selecting a card previously skipped in the entity's obfuscation cycles. Along with the selected draw card 405, the entity 105 also returns a new value for the draw card pointer 402, which was the actual end value of the shuffle/pluck algorithm pointer combined with an obfuscation value 405 that was selected before the private hands were determined. As before, the exact nature of the structure of algorithm 403's obfuscation functionality is not important so long as its output could not be predicted without knowledge of the internal values generated in the first entity 105. The obfuscated end pointer 402 is then returned with the associated draw card identity 406 to the global issuer 151. This process is then repeated with the same or other entities in the gaming quorum to produce the number of draw cards 406 thru 410 necessary to complete play of the hand 401.

In a preferred embodiment, the structure of the draw card shuffle and pluck algorithm would allow for either selection of a card that would be plucked by cycling the LCG from the starting pointer or to possibly select one of the cards that may have been skipped as part of the obfuscation process when the same entity was selecting its private hand. One method of achieving this functionality is to assign some probability of selecting a skipped card whenever the LCG cycles through a null pointer address 352 (FIG. 7).

Thus, so long as the period of the LCG is not exhausted by the private hand and draw card selection processes, the embodiments of 375 (FIG. 8) and 400 (FIG. 9) can be utilized to select cards for a game where no one entity has a priori knowledge of another entity's private hand. In the rare cases where selection of a draw card would cause a LCG algorithm to repeat a period, the cards skipped by the entities in the obfuscation process can be used exclusively for draw card candidates.

Figure 10:
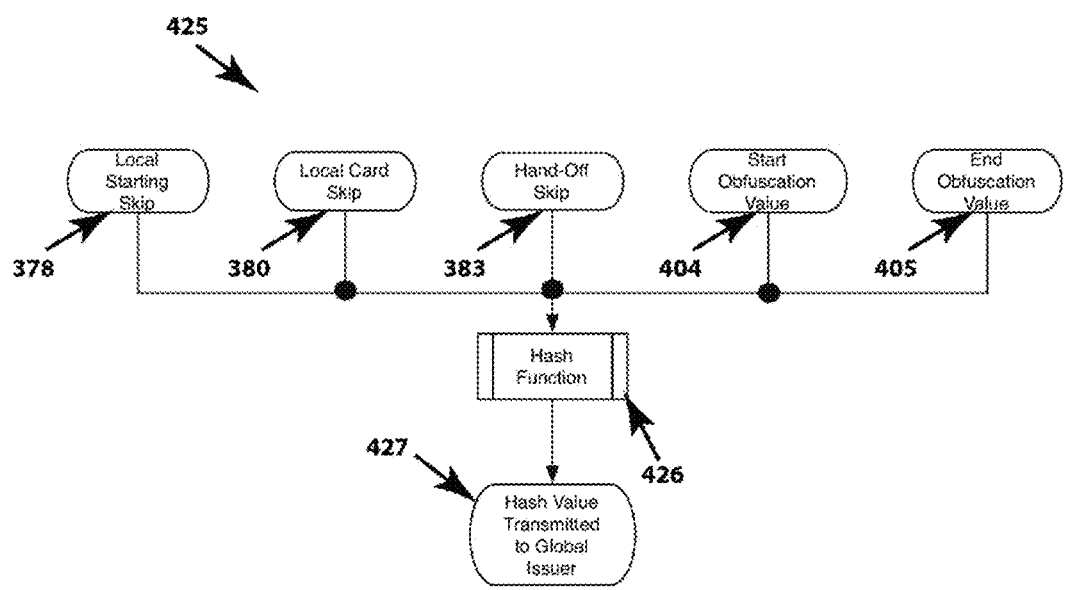
FIG. 10 is a flow chart of an embodiment wherein the obfuscation values utilized in FIG. 8 and FIG. 9 are all combined into a single hash value transmitted to the global issuer; and, FIG. 11 is a two-dimensional time line illustrating information segmentation is achieved with respect to time of FIG. 7 thru FIG. 10.

As in previous embodiments, after each hand is played and a winner determined, it is then necessary to reconcile the hand to ensure that all entities in the quorum acted legitimately. This process can be similar to embodiment 250 of FIG. 5 with all the various entities 105, 106, 201, 202, and 203 participating in the gaming hand quorum passing all of their respective obfuscation values to the global issuer 151 at the conclusion of the game hand 255. As before, once all of the clear text values have been received by the global issuer 151, the previous received hashes or cipher text 161 that were transmitted from the same entities before the start of quorum game hand play can be computationally compared to ensure that the received clear text obfuscation values compute to the previously received hashes. However, in the LCG embodiments, multiplicities of obfuscation values are employed during the play of each hand. While it is not essential, it is desirable (to minimize logistical communications) that all of the obfuscation values employed by an entity are combined into one hash or cipher text that is transmitted to the global issuer prior to play. For example, FIG. 10 illustrates one possible embodiment 425 wherein all of the obfuscation values 378, 380, 383, 404, and 405 utilized in the embodiments of 375 and 400 are concatenated and applied to a single hash function 426. In this embodiment the single resulting output hash 427 is transmitted to the global issuer by all entities participating in the gaming quorum prior to any play.

Thus, LCG type embodiments also partition quorum game play information to various entities with information only shared at specific times and no one entity in the gaming quorum (including the global issuer) having a priori knowledge of the other entities' private hands. In these LCG type embodiments, the partitioning of information is achieved by the obfuscation of the LCG pointer when it is handed from one entity to another. Nevertheless, as in previous embodiments, the timing of critical information exchange is critical to the security of the system.

Figure 11:
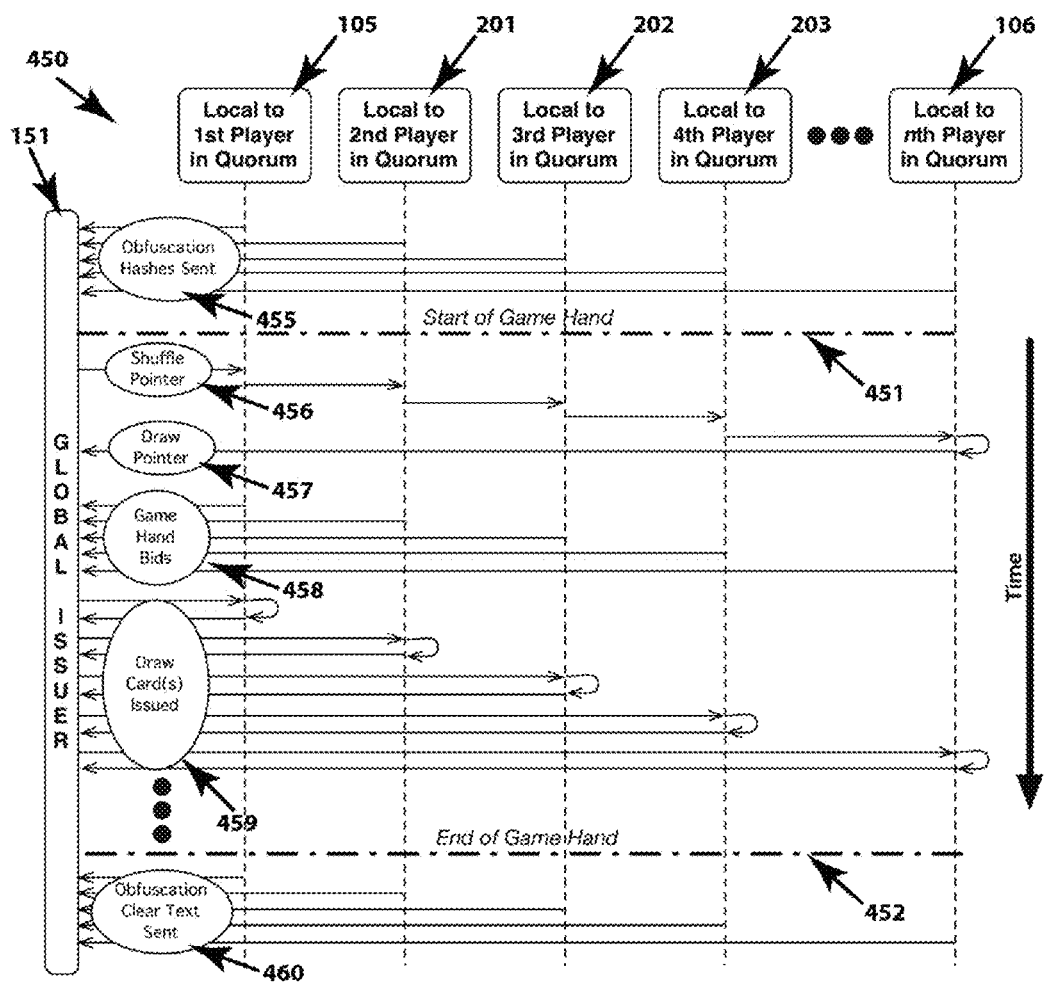

FIG. 11 illustrates a two-dimensional time line 450 diagrammatically illustrating how game play information is partitioned relative the various entitles with respect to time. In FIG. 11, time flows from top to bottom with the various entities 105, 106, 201, 202, and 203 in the gaming quorum illustrated in a horizontal row across the top of 450 and the global issuer 151 shown vertically on the left-hand side of 450. As previously discussed, in some embodiments, the global issuer 151 can also physically be an entity 105, 106, 201, 202, and 203 in the gaming quorum; however, for the purposes of clarity of FIG. 11 the global issuer 151 functionality is illustrated separately.

At the top of timeline 450, the entire process is shown starting with the various entities 105, 106, 201, 202, and 203 in the gaming quorum all transmitting cryptographic hashes of their obfuscation values 455 to the global issuer 151. As previously stated, these various hashes can be transmitted in groups covering multiple quorum game hands, the significant point being that hashes are received 455 by the global issuer 151 from all entities 105, 106, 201, 202, and 203 participating in the gaming quorum prior to quorum game play for the given hand 451.

After the hashes are received 455, the global issuer 151 transmits the starting pointer 456 and other parameters to the first entity 105 in the gaming quorum. Once entity 105 receives the parameters and pointer, its local LCG type algorithm selects its player's private hand. Once the hand selection is completed, entity 105 then obfuscates the ending pointer and passes the original parameters plus the current (obfuscated) pointer to the second entity 201 in the gaming quorum. Entity 201 then applies the original parameters and modified pointer to its local LCG algorithm to select its player's private hand and this same process is continued throughout all entities participating in the gaming quorum (202, 203, and 106) with the final $n^{th}$ entity 106 obfuscating the pointer and passing its obfuscated value 457 back to the global issuer 151.

In the example of the game Texas Hold'em, bidding (i.e., call, fold, or raise) between the players in the gaming quorum would then ensue with the various bids optionally transmitted 458 to the global issuer 151 for logging and possible use in selecting the entity to select a draw card.

After the first round of bidding is concluded, the global issuer 151 selects entities in the gaming quorum 105, 106, 201, 202, and 203 to dispense any needed draw cards 459—e.g., three draw cards for the flop in Texas Hold'em. Once a selected entity (e.g., 105, 106, 201, 202, or 203) receives a request from the global issuer 151, it selects the next draw card and transmits that draw card's identity 459 back to the global issuer 151 for use in the quorum game hand. This process 459 can be repeated until a sufficient number of draw cards are generated for the given stage of the game hand—e.g., three draw cards for the flop in Texas Hold'em. At this point the bidding 458 and draw card issuing 459 processes may or may not be repeated depending on game play.

Eventually the quorum game hand will end 452 with one or more players the winner(s) for that hand. The only remaining information transfer to occur is for all the entities in the quorum 105, 106, 201, 202, and 203 to send their clear text obfuscation values 460 to the global issuer 151 to certify that the previous game hand was legitimate by calculating each hash value of the clear text obfuscation values received and comparing the newly calculated hashes to the obfuscation value hashes received 455 before the start of the game hand 451. Since the game hand is concluded 452, the securities of the clear text pluck seeds are no longer of any concern.

It should be appreciated by those skilled in the art that various modifications and variations may be made present invention without departing from the scope and spirit of the invention. It is intended that the present invention include such modifications and variations as come within the scope of the appended claims.

What is claimed is:

1. A secure computer platform implemented method for generating shuffled objects across multiple entities, comprising:

a global issuer shuffling a predefined array of objects into a new order with a global computer platform executing a shuffle algorithm and using a global shuffle seed, wherein the shuffle algorithm is known to the multiple entities;

dividing the shuffled array of objects into sub-shuffles, and distributing one of the sub-shuffles to each of the multiple entities, wherein all of the objects in the shuffled array are assigned to one of the sub-shuffles; and at each of the multiple entities, applying a local pluck algorithm and local pluck seed to the sub-shuffle with a computer platform to produce a final set of the objects used by the entity for play of a game, wherein the local pluck algorithm and local pluck seed are not known to the other entities.

2. The method as in claim 1, wherein the global shuffle seed is made known to the multiple entities at conclusion of the game.

3. The method as in claim 1, wherein in order to ensure that all of the objects in the shuffled array are assigned to one of the sub-shuffles, the sub-shuffles may not have the same number of objects.

4. The method as in claim 1, wherein the final set of objects varies as a function of the game played with the objects.

5. The method as in claim 4, wherein the predefined array of objects is a standard card deck of fifty-two cards, and the final set of objects corresponds to a player's hand in a card game.

6. The method as in claim 1, wherein each entity is required to register its local pluck seed in encrypted form with the global issuer prior to receipt of the sub-shuffle, the entity transmitting a decryption key for the encrypted pluck seed at conclusion of the game.

7. The method as in claim 6, wherein the global issuer receives the encrypted local pluck seed from each entity prior to the global issuer generating the global shuffle seed.

8. The method as in claim 1, wherein the game requires selection of additional draw objects that are common to the entities, each of the entities generating one or more potential draw objects from remaining objects in their respective sub-shuffle and transmitting the potential draw objects to the global issuer, wherein the global issuer randomly selects a final set of common draw objects from all of the potential draw objects and transmits the final set of common draw objects to the entities.

9. The method as in claim 8, wherein the entities use their local pluck algorithm and local pluck seed to generate the potential draw objects.

10. The method as in claim 8, wherein the entities use their local pluck algorithm and a new local pluck seed transmitted by the global issuer to generate the potential draw objects.

11. The method as in claim 1, wherein the global issuer receives the local pluck seed in encrypted form from each entity prior to the global issuer generating the global shuffle seed, the entities transmitting a decryption key for their encrypted local pluck seed at conclusion of the game as well as a clear text version of the local pluck seed, the global issuer comparing the clear text version of the local pluck seed with a decrypted versions of the local pluck seed received from the entity prior to issue of the local pluck seek to certify the game as legitimate.

* * * * *